United States Patent
Level et al.

(10) Patent No.: US 7,741,730 B2
(45) Date of Patent: Jun. 22, 2010

(54) METHOD OF DETERMINATION OF A DISTRIBUTION OF ENERGY TO A PLURALITY OF ELECTRICAL LOADS AND CORRESPONDING SYSTEM

(75) Inventors: Yves Level, Vermaison (FR); Gerard Pierre Louis Ledee, Salvagny (FR)

(73) Assignee: Eurothem Automation, Dardilly (FR)

( * ) Notice: Subject to any disclaimer, the term of this patent is extended or adjusted under 35 U.S.C. 154(b) by 521 days.

(21) Appl. No.: 11/726,906

(22) Filed: Mar. 23, 2007

(65) Prior Publication Data
US 2007/0244603 A1 Oct. 18, 2007

(30) Foreign Application Priority Data
Mar. 24, 2006 (FR) .................................. 06 02582

(51) Int. Cl.
*H02J 3/06* (2006.01)
(52) U.S. Cl. ........................................ 307/20; 700/291
(58) Field of Classification Search ............. 307/18–20; 700/291, 286; 703/18
See application file for complete search history.

(56) References Cited

U.S. PATENT DOCUMENTS 6,061,609 A * 5/2000 Kanoi et al. ................. 700/291
7,010,363 B2 * 3/2006 Donnelly et al. .............. 700/19
7,406,364 B2 * 7/2008 Andren et al. .............. 700/286

FOREIGN PATENT DOCUMENTS

| EP | 0 563 790 | 10/1993 |
|----|-----------|---------|
| EP | 0 710 051 | 5/1996 |
| EP | 1 018 793 | 7/2000 |

* cited by examiner

*Primary Examiner*—Albert W Paladini
(74) *Attorney, Agent, or Firm*—Sampson & Associates, P.C.

(57) ABSTRACT

This method of determination of a distribution of energy to a plurality of electrical loads ($12_1$, $12_2$, . . . , $12_n$) during a modulation period (T), the energy coming from at least one generator (14), the supply of a predetermined quantity of energy to any one of the electrical loads during this modulation period being effected by the generator emitting during a predetermined fraction of the modulation period an electrical signal the power whereof corresponds to that demanded by that electrical load, includes a temporal distribution of the electrical signals emitted by the generator in the modulation period in accordance with a distribution criterion determined as a function of the electrical signals and applied successively to each electrical signal in the same modulation period.

The temporal distribution criterion for the electrical signals is determined as a function of the temporal length and the power of the electrical signals.

9 Claims, 10 Drawing Sheets

METHOD OF DETERMINATION OF A DISTRIBUTION OF ENERGY TO A PLURALITY OF ELECTRICAL LOADS AND CORRESPONDING SYSTEM

RELATED APPLICATIONS

This application is claiming the priority of French Patent application No. 06 02582 filed on Mar. 24, 2006, entitled "Method of Determination of a Distribution of Energy to a Plurality of Electrical Loads and Corresponding System".

FIELD OF INVENTION

The invention concerns a method of determination of an energy distribution to a plurality of electrical loads during a modulation period, that energy coming from at least one generator. The invention concerns also an energy distribution system adapted to implement that method.

BACKGROUND

If the supply of a predetermined quantity of electrical energy to any one of the electrical loads during this modulation period is effected by the generator emitting during a predetermined fraction of the modulation period an electrical signal the power whereof corresponds to that of this electrical load, it is known to use a method including a temporal distribution of the electrical signals sent by the generator in the modulation period in accordance with a predetermined distribution criterion.

For an alternating current energy distribution application, the electrical signals emitted by the generator are more particularly wave streams. In direct current, they may take any other form.

For example, in the European patent granted under the number EP 0 710 051, there is provision for using a method which, by successive slippages of wave streams relative to each other, enables, at the end of a certain number of modulation periods, convergence toward a more regular distribution of the instantaneous power emitted by the generator to supply the electrical loads.

According to the above patent, the calculations to be effected to converge toward this best temporal distribution of the wave streams are simple, but at the cost of a convergence that is slow.

Thus it is preferable to use methods the convergence whereof is fast, or even instantaneous. This is for example the case of the method used by the energy distribution system marketed by the company Eurotherm Automation for more than twenty years under the name "483". That system effects a temporal distribution of the electrical signals emitted by the generator in a modulation period in accordance with a distribution criterion determined as a function of the electrical signals and applied successively to each electrical signal in this same modulation period. More precisely, the distribution criterion is linked to the number of electrical signals to be distributed in the modulation period, that is to say to the number of electrical loads that have to be supplied with energy during that modulation period. According to this criterion, the modulation period is divided into as many time intervals of the same length as there are electrical signals to be transmitted and the rising edge of an electrical signal is transmitted at the beginning of each interval. The consequence of this is a regular temporal distribution of the rising edges of the electrical signals to be emitted.

As a result of this, a relatively good temporal distribution of the electrical signals emitted by the generator is obtained instantaneously, that is to say in a single modulation period. Nevertheless this distribution is not the optimum distribution.

The invention aims to remedy the limitations of the existing methods, and in particular to improve the method implemented by the "483" system, by providing a method of determination of an energy distribution using a more refined distribution criterion.

SUMMARY

The invention therefore has for subject matter a method of determination of a distribution of energy to a plurality of electrical loads during a modulation period, the energy coming from at least one generator, the supply of a predetermined quantity of energy to any one of the electrical loads during this modulation period being effected by the generator emitting during a predetermined fraction of the modulation period an electrical signal the power whereof corresponds to that demanded to said electrical load, this method including a temporal distribution of the electrical signals emitted by the generator in the modulation period in accordance with a distribution criterion determined as a function of the electrical signals and applied successively to each electrical signal in the same modulation period, wherein the temporal distribution criterion for the electrical signals is determined as a function of the temporal length and the power of the electrical signals.

The temporal length and the power of an electrical signal are, before temporal distribution of all the electrical signals in the modulation period, the two parameters that define this electrical signal completely. Thus taking these two parameters into account in the temporal distribution criterion leads to an optimum distribution of the instantaneous power distributed by the generator in the modulation period.

Before effecting the distribution of the electrical signals in the modulation period, it is preferable to effect a step of classification of the electrical signals in order of priority in accordance with a predetermined priority criterion. Thus optimization of the method resides not only in the use of an optimum distribution criterion but furthermore in the order of the electrical signals to which that distribution criterion is successively applied.

The priority criterion is preferably determined from the temporal length of each electrical signal (the electrical signals being classified in order of decreasing temporal length in this case, for example), from the power of each electrical signal (the electrical signals being classified in order of decreasing power in this case, for example), or from the product of the temporal length by the power of each electrical signal (the electrical signals being classified in order of decreasing product of temporal length by power in this case, for example).

A method according to the invention of determination of an energy distribution preferably also includes a plurality of classification steps in accordance with a plurality of respective priority criteria, each classification step being followed by a step of distribution of the electrical signals in the modulation period and a step of assessing if that distribution is the optimum distribution by the calculation of an efficiency factor, the distribution finally retained being that corresponding to the best value of the efficiency factor.

More precisely, the successive temporal distribution of the electrical signals in the modulation period is iterative, for example, and may include the following steps in each iteration in which a temporary distribution in the modulation period induces at least one power range:

selection, in this temporary distribution, of a minimum power range;

if the electrical signals to be distributed include at least one electrical signal whose temporal length is identical to that of the selected range, selection of the electrical signal of higher power whose temporal length is equal to that of the selected range;

if not, selection of the next electrical signal in the priority order defined during the classification step;

positioning of said electrical signal in the selected range, thus generating a new temporary distribution.

The distribution of the predetermined quantity of energy to each electrical load necessitating the global emission by the generator of an average electrical power during the modulation period, there is optionally further defined a reduction factor for that average electrical power, said reduction factor then being applied to each predetermined quantity of energy to be supplied to the corresponding electrical load.

In this case, it is further possible to associate with at least one electrical load a minimum threshold value of the reduction factor applied to said electrical load.

The invention also consists in a system for distribution of energy to a plurality of electrical loads during a modulation period, the energy coming from at least one generator, comprising at least one switch per electrical load for the supply of a predetermined quantity of energy to said electrical load during said modulation period by the transmission of an electrical signal the power whereof corresponds to that demanded to said electrical load and that is emitted by the generator, during a predetermined fraction of the modulation period, characterized in that said system further includes a calculator for effecting a temporal distribution of the electrical signals emitted by the generator in the modulation period in accordance with a distribution criterion determined as a function of the temporal length and the power of the electrical signals and applied successively to each electrical signal in the same modulation period, and a device for controlling the switches for application by the switches of this temporal distribution effected by the calculator.

Each switch preferably includes at least one thyristor. In fact, by virtue of its price and its robust nature, the thyristor appears at present to be the best power electronic component able to implement this switch function in the system concerned. Having said this, each switch could consist of any other interrupter member.

BRIEF DESCRIPTION OF DRAWINGS

The invention will be better understood with the aid of the following description, given by way of example only and with reference to the appended drawings, in which.

DETAILED DESCRIPTION

Figure 1:
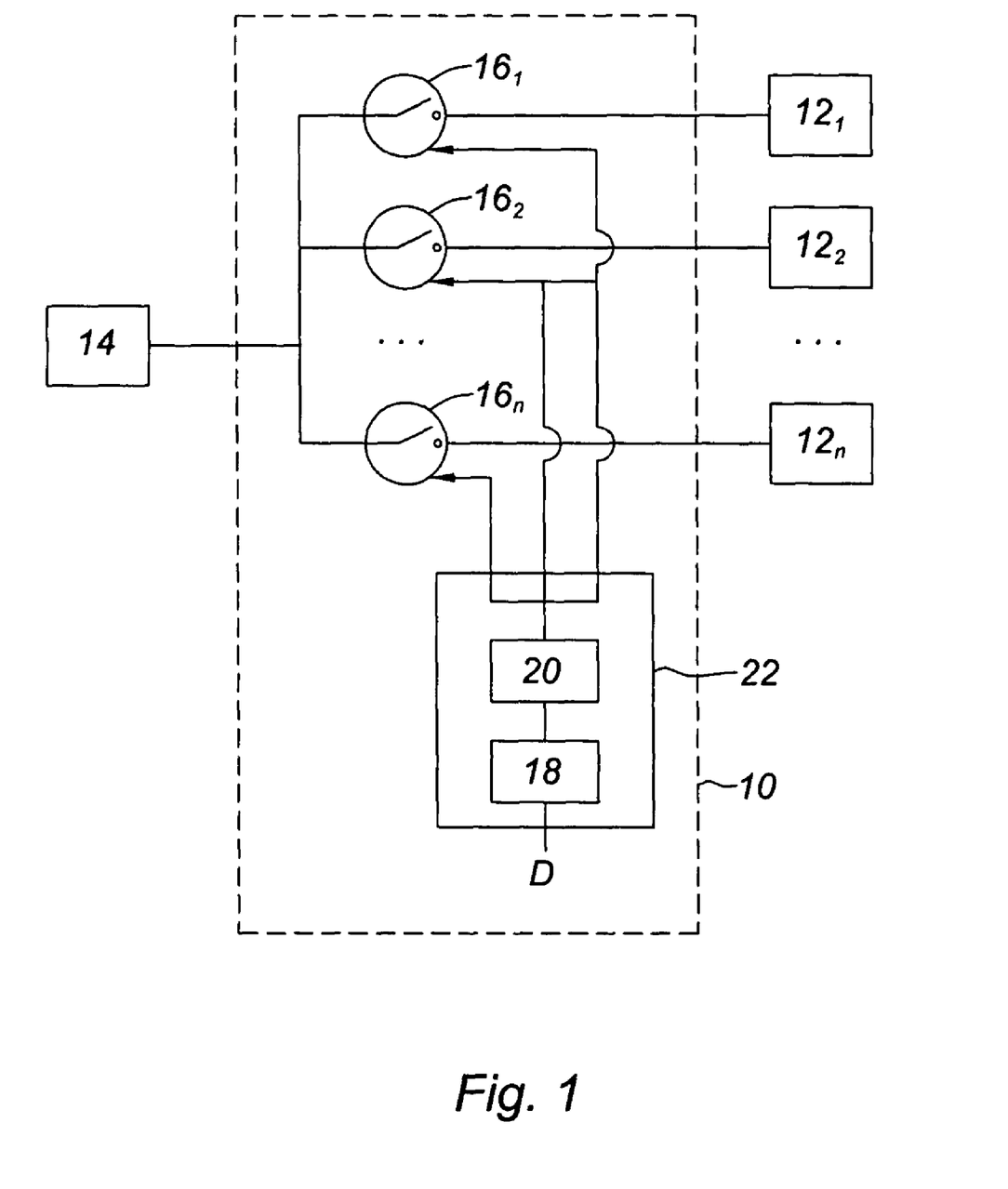
FIG. 1 shows diagrammatically the structure of an energy distribution system in accordance with one possible embodiment of the invention.

The installation shown in FIG. 1 includes a system 10 for distribution of electrical energy to a plurality of electrical loads $12_1, 12_2, \ldots, 12_n$ during a modulation period with the aid of at least one generator 14.

The application described hereinafter concerns distribution of alternating current energy. The electrical signals emitted by the generator in this particular case take the form of wave streams, but could take other forms for other applications of the invention.

The system 10 comprises a plurality of switches $16_1, 16_2, \ldots, 16_n$ with one switch for each electrical load. Each switch 16 preferably consisting of a pair of thyristors connected in anti-parallel, is disposed, between the generator 14 and the corresponding electrical load 12 in the electrical power supply circuit that connects the generator 14 to the electrical load $12_i$.

The supply of a predetermined quantity of energy to any one of the electrical loads $12_i$ during a modulation period is effected by the generator 14 outputting, during a predetermined fraction of the modulation period, an electrical wave stream the power whereof corresponds to that of that electrical load $12_i$.

The start of the emission of the electrical wave stream for supplying power to the electrical load 12; is triggered by the closure of the switch $16_i$. The end of the emission of this electrical wave stream is triggered by the opening of the switch $16_i$. Thus, by determining the times of opening and of closing of each of the switches $16_1, 16_2, \ldots, 16_n$ of the system 10, there is defined a temporal distribution of the wave streams emitted by the generator 14 in the same modulation period.

In conformance with the invention, a criterion of temporal distribution of the wave streams in a modulation period is determined as a function of the temporal length and the power of the wave streams.

To effect this temporal distribution with the aid of the distribution criterion defined above, the system includes a central unit 22, taking for example the form of a microprocessor associated with one or more memories, which includes a calculator 18.

This calculator 18 optionally puts into order beforehand the various wave streams to be emitted by the generator 14 to the various electrical loads $12_1, 12_2, \ldots 12_n$ and then successively processes these wave streams in such a manner as to distribute them temporally in the modulation period in an optimum manner with the aid of the distribution criterion defined above. The operation of this calculator 18 will be described in detail with reference to FIGS. 4 to 8b.

Furthermore, the central unit 22 comprises a device 20 for controlling the switches $16_1, 16_2, \ldots 16_n$. This control device 20 implements an interface function between the calculator 18 that defines the temporal distribution of the wave streams in the modulation period and the switches $16_1, 16_2, \ldots 16_n$ that actually effect this temporal distribution.

A wave stream is an alternating current electrical signal emitted by the generator 14 during a fraction of the modulation period. As may be seen in FIGS. 2a, 2b and 2c, such a wave stream may be diagrammatically represented by a rectangle.

Figure 2A:
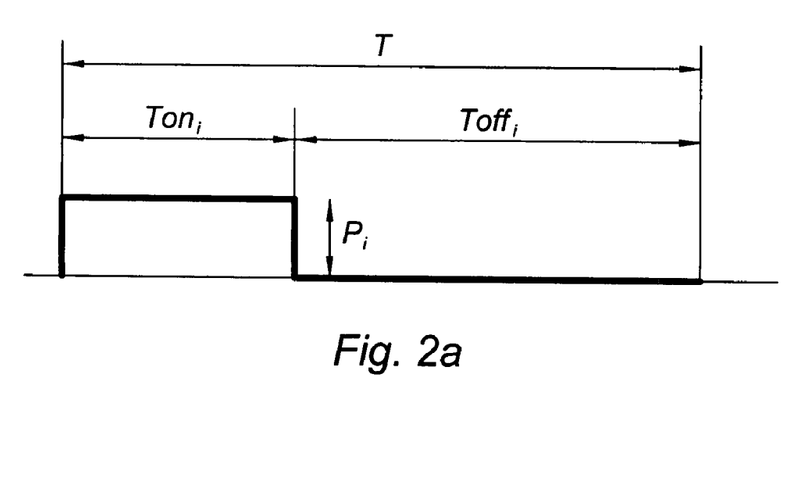
FIGS. 2a, 2b and 2c show diagrammatically the general appearance of an electrical signal intended to be output by a generator in a modulation period.
Figure 2B:
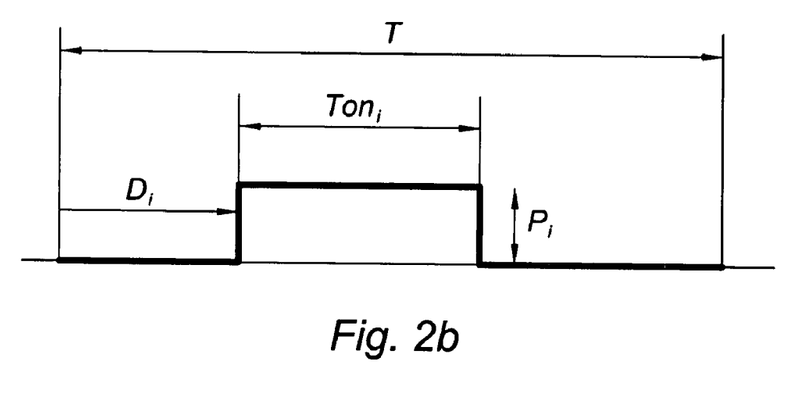
Figure 2C:
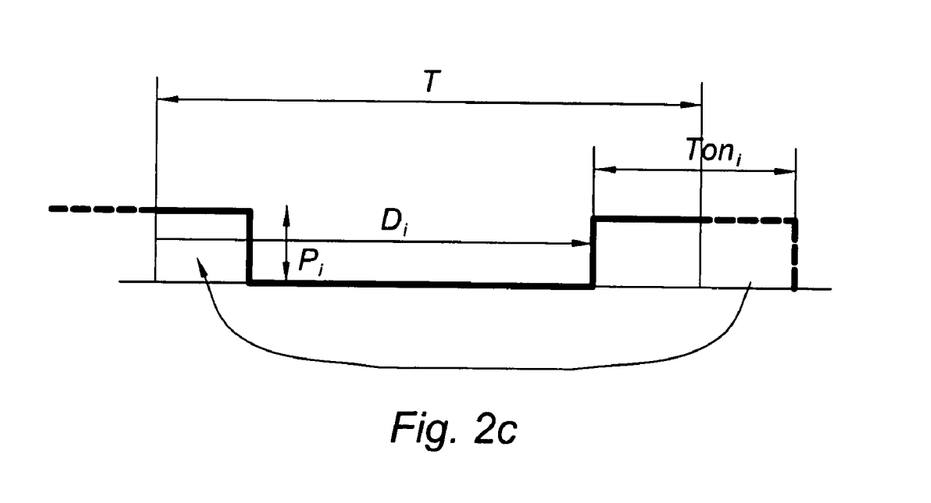

This rectangle has a length $Ton_i$ that corresponds to the temporal length of the wave stream and represents a fraction of the modulation period T.

It also has a height $P_i$ that corresponds to the power of the wave stream and therefore of the corresponding electrical load $12_i$.

The corresponding switch $16_i$ is closed during the emission of the wave stream, that is to say during the time period $Ton_i$, and is open during the time period $Toff_i = T - Ton_i$.

As shown in FIG. 2a, the wave stream may be emitted at the start of the modulation period T.

It may also be offset by a delay $D_i$ in the modulation period T, as shown in FIG. 2b.

Finally, as shown in FIG. 2c, if the offset $D_i$ is greater than $Toff_i$, because of the periodic nature of the process, a first part of the wave stream is emitted at the end of the modulation period, the other part being emitted at the beginning of the modulation period.

Figure 3:
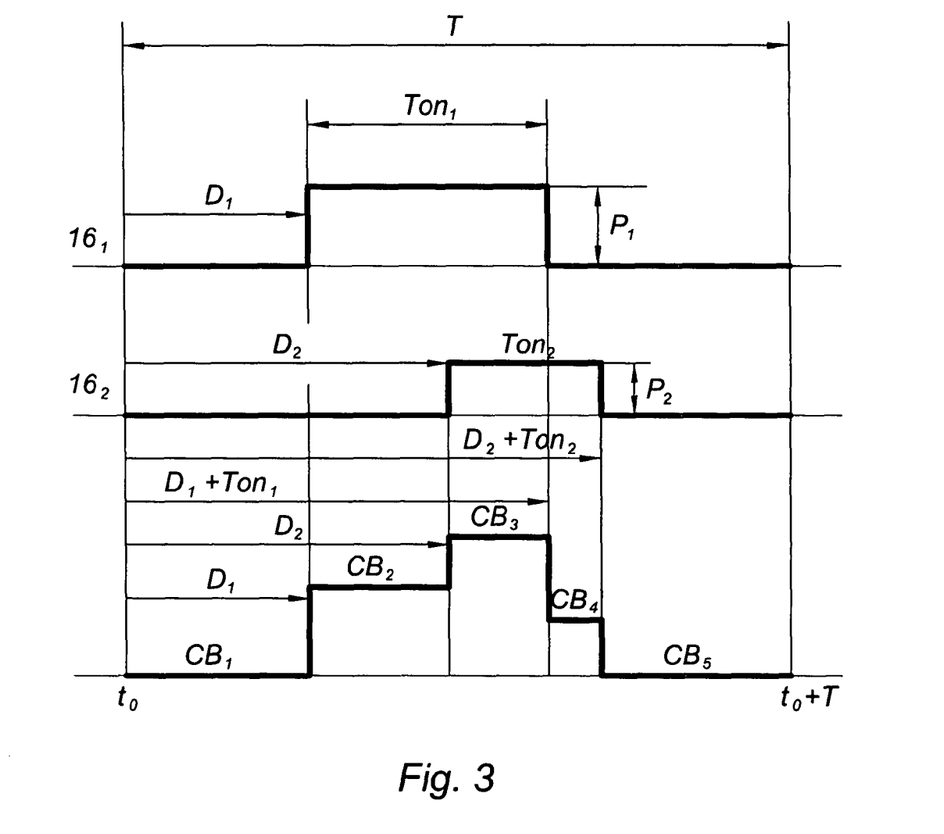
FIG. 3 represents diagrammatically the general appearance of the superposition of two electrical signals in the same modulation period.

FIG. 3 shows the optional superposition of two wave streams emitted by the generator 14 in the same modulation period.

A first wave stream of temporal length $Ton_1$ and of power $P_1$ is emitted by the generator 14 with a delay $D_1$ to the electrical load $12_1$ via the switch $16_1$.

A second wave stream of temporal length $Ton_2$ and of power $P_2$ is emitted by the generator 14 with a delay $D_2$ to the electrical load $12_2$ via the switch $16_2$.

If the two wave streams are superposed at least in part, as is the case in the example shown in FIG. 3, the powers add in the area of superposition of the wave streams, the generator 14 then transmitting an electrical power equal to the sum $P_1 + P_2$.

As a result of this, in the modulation period T, a plurality of ranges of power emitted by the generator 14 may be distinguished. The modulation period is in fact divided into five intervals in the FIG. 3 example. During the interval $[t_0, t_0+D_1]$ no power is emitted. During the interval $[t_0+D_1, t_0+D_2]$, a power $P_1$ is emitted. During the interval $[t_0+D_2, t_0+D_1+Ton_1]$, a power $P_1+P_2$ is emitted. During the interval $[t_0+D_1+Ton_1, t_0+D_2+Ton_2]$, a power $P_2$ is emitted. Finally, during the last interval $[t_0+D_2+Ton_2, t_0+T]$, no power is emitted.

Generalizing this simple example to n electrical loads to be supplied with electrical energy in the same modulation period, a large number of possible configurations of superposition of wave streams is obtained, some of which correspond to strong variations of the instantaneous power output by the generator 14. The object of the invention is to limit these variations as much as possible.

For measuring these variations, an efficiency factor f is defined with the aid of the following magnitudes:

$$P_{max} = \sum_{i=1}^{n} Pi;$$

$CP_{min}$ = the lowest value of the instantaneous power emitted by the generator 14 during the modulation period T for a given distribution; and $CP_{max}$ = the highest value of the instantaneous power emitted by the generator 14 during the modulation period T for a given distribution.

The efficiency factor f is then given by the following equation:

$$f = \frac{P_{max} - (CP_{max} - CP_{min})}{P_{max}}.$$

Figure 4:
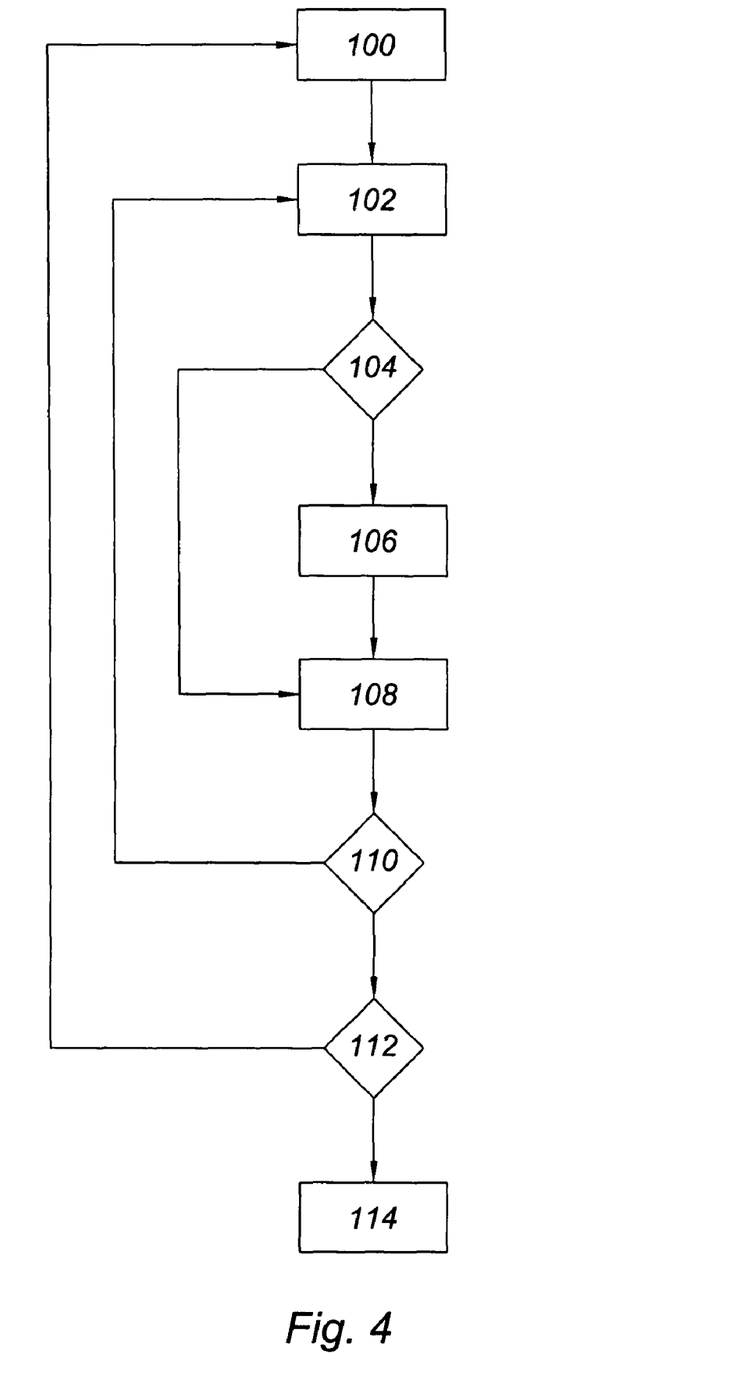
FIG. 4 shows the successive steps of a method of determination of an energy distribution in accordance with one possible embodiment of the invention.

The calculator 18 then carries out the steps of the method shown in FIG. 4.

This method includes a first step 100 of classification of the wave streams in order of priority in accordance with a predetermined priority criterion. The priority criterion is for example the temporal length of each wave stream, the power of each wave stream or the product of the temporal length by the power of each wave stream.

If the priority criterion is the temporal length of each wave stream, the latter are put into decreasing temporal length order.

The method is then applied iteratively for each wave stream. At a step of this iteration, a certain number of wave streams are already distributed in the modulation period, thus generating a temporary distribution.

The calculator 18 selects the first range of minimum power in this temporary distribution during a step 102.

During the next step 104, the calculator 18 looks to see if the wave streams to be distributed include at least one wave stream the temporal length whereof is identical to that of the selected range. If this is the case, the wave stream is selected whose temporal length is equal to that of the selected range, of greater power.

Figure 5:
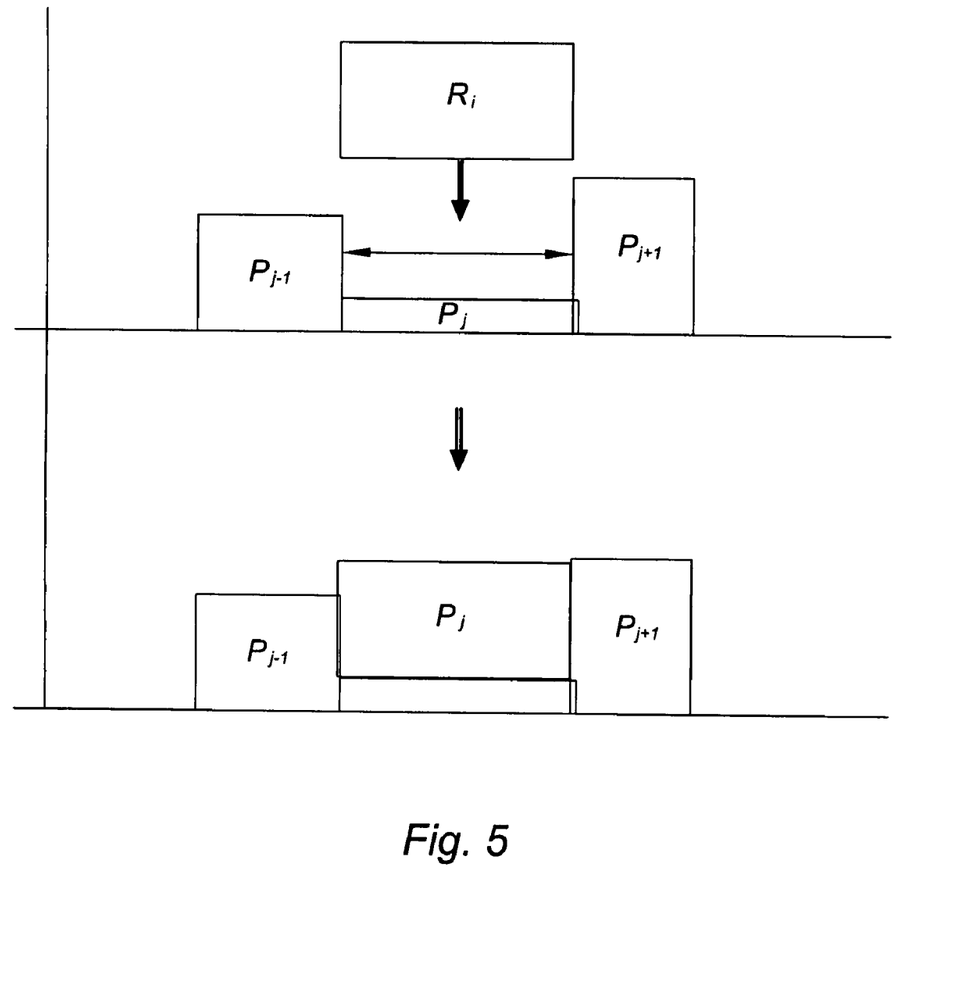
FIGS. 5, 6, 7, 8a and 8b show diagrammatically different possible configurations of superposition of electrical signals during the application of the method from FIG. 4.

There follows a step 108 of positioning this wave stream in the selected range, in accordance with the configuration represented in FIG. 5.

Otherwise, if the wave streams to be distributed do not include a wave stream whose temporal length is identical to that of the selected range, there follows a step 106 of selection of the next wave stream in the priority order defined during the first step 100.

Figure 6:
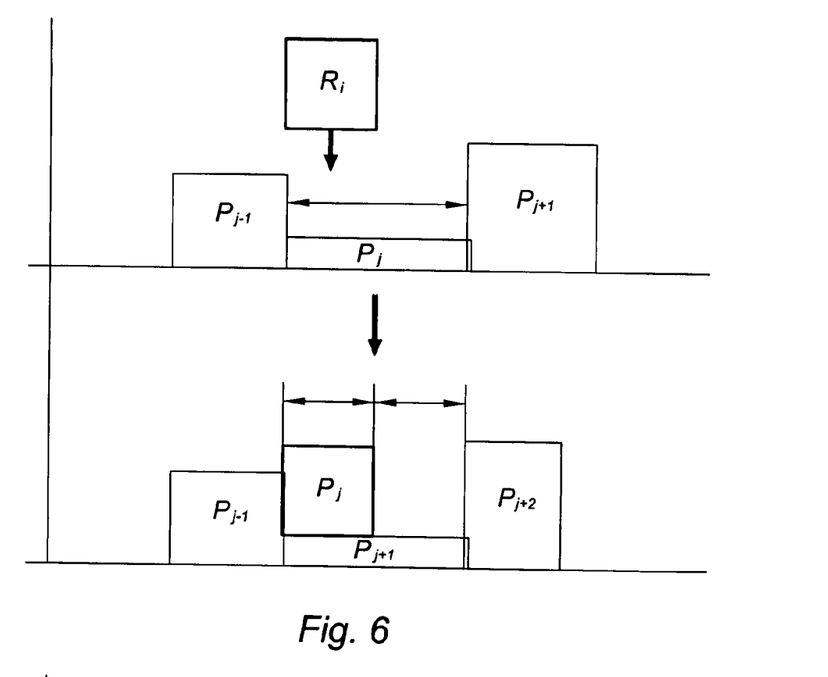
Figure 7:
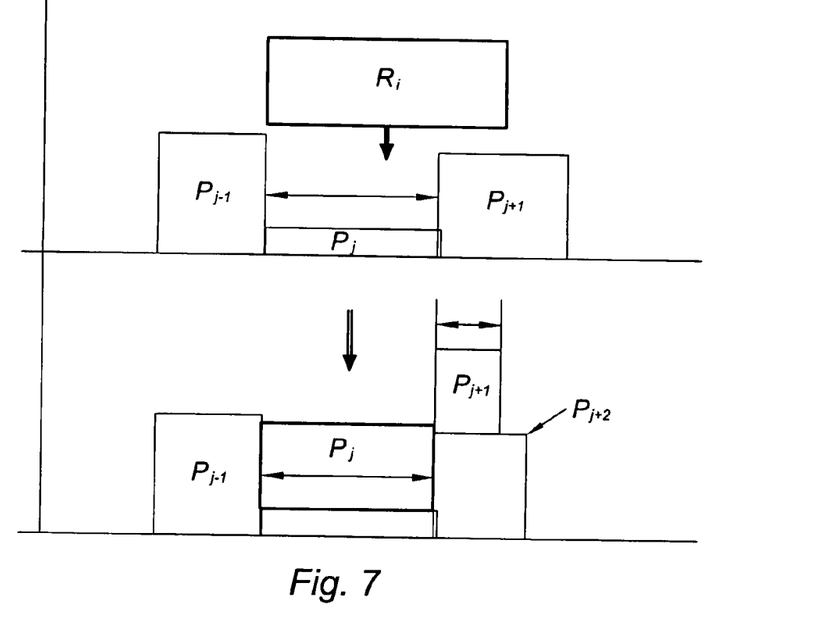

In this case, two configurations are possible, and represented in FIGS. 6 and 7, respectively.

In conformance with the first configuration represented in FIG. 6, if the selected wave stream has a temporal length less than that of the selected range, that wave stream is positioned during the step 108 so that its rising edge corresponds to the beginning of the selected range. The wave stream is integrated completely into the selected range.

In conformance with the second configuration represented in FIG. 7, if the selected wave stream has a temporal length greater than that of the selected range, that wave stream is also positioned during the step 108 so that its rising edge corresponds to the beginning of the selected range. However, a portion of the wave stream extends beyond the selected range. That portion is therefore positioned in the subsequent range or ranges.

Figure 8A:
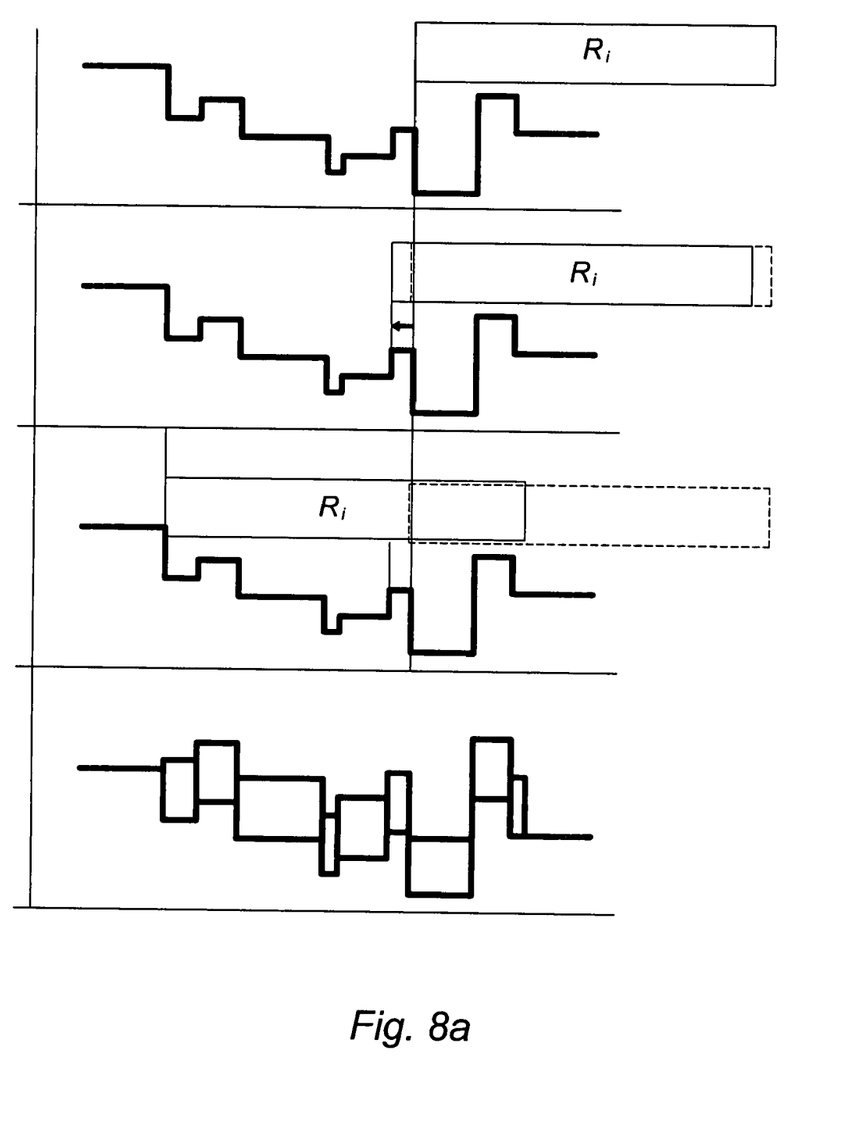
Figure 8B:
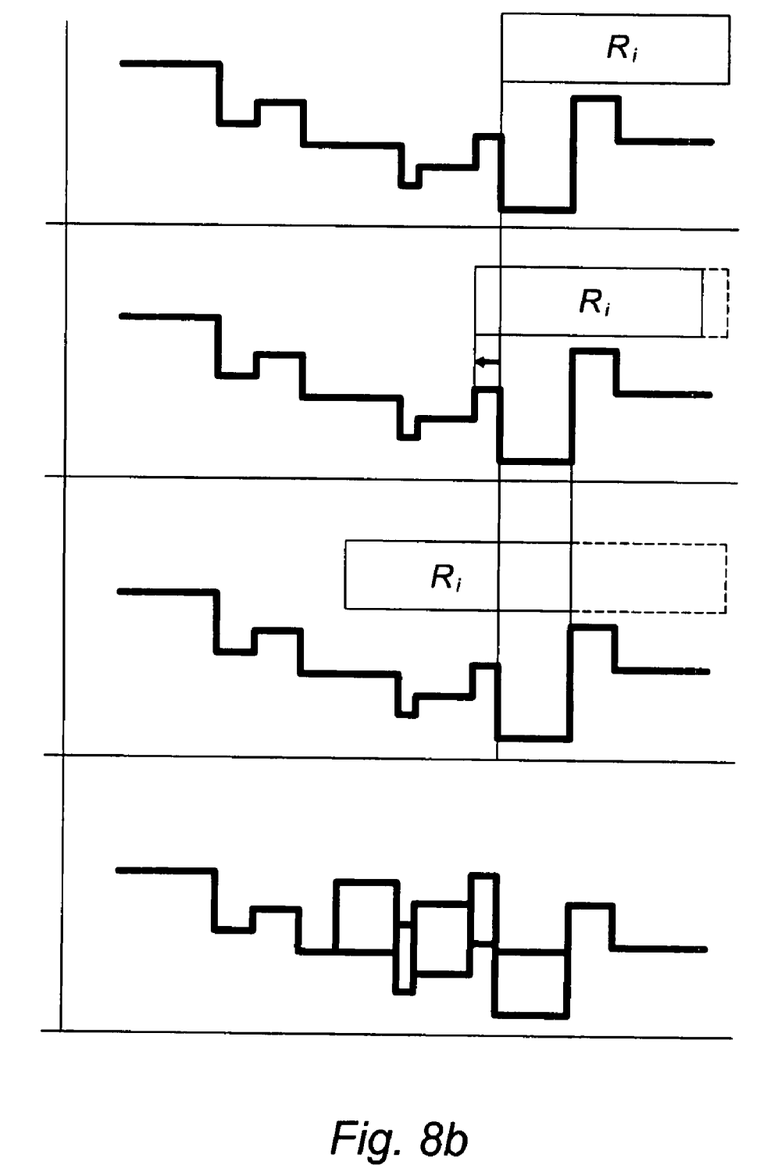

Optionally, if the FIG. 7 configuration applies, the selected wave stream may also be moved around the selected range, in conformance with what is shown in FIGS. 8a and 8b.

In FIG. 8a, if the rising edge of the selected wave stream is positioned at the beginning of the selected range, the latter is shifted toward the left in the modulation period until its rising edge is positioned at the end of the first range whose power is greater than that of the range that follows temporally the selected range.

If, as shown in FIG. 8b, during the shift toward the left, the falling edge of the selected wave stream is positioned at the end of the selected range before its rising edge has reached a range whose power is greater than that of the range that follows temporally the selected range, then the selected wave stream is retained at that position.

When the selected wave stream has been positioned, there follows a step 110 during which the calculator 18 verifies if there remains at least one wave stream to be positioned. If this is the case, the process is resumed from the step 102. If not, there follows a step 112 which verifies whether the iterative process has been executed on the basis of all possible priority criteria. If this is not the case, the process is resumed from the step 100 to put the wave streams into order in accordance with a new priority criterion (the power of each wave stream or the product of the temporal length by the power of each wave stream, for example). If not, there follows the final step 114 of selection of the best distribution.

Thus, in conformance with the method described above, the wave streams may first be classified in order of decreasing temporal length, after which the iterative process is executed a first time. There is then obtained a first result supplying a first efficiency factor value. The first classification step is then repeated with the wave streams classified in decreasing power order, after which the iterative process is executed a second time. There is then obtained a second result providing a second efficiency factor value. Finally, the first classification step is repeated, classifying the wave streams in order of decreasing product of the temporal length by the power of each wave stream, after which the iterative process is executed a third time. There is then obtained a third result supplying a third efficiency factor value.

The step 114 then selects that of the three distributions obtained that produces the highest efficiency factor.

Moreover, it is possible to impose a reduction factor r on the quantity of energy supplied by the generator 14 to the electrical loads $12_1, 12_2, \ldots, 12_n$ during the modulation period.

Knowing that the mean power $P_t$ emitted by the generator 14 during the modulation period is defined by the following equation:

$$P_t = \frac{\sum_{i=1}^{n} P_i Ton_i}{T},$$

the reduction factor r imposes a reduced mean power $P_s$ emitted by the generator 14, for the purpose of reducing energy consumption:

$$P_s = rP_t.$$

This reduction factor may be applied to all the electrical loads without distinction. In this case it is applied to the temporal lengths of the corresponding wave streams.

However, any electrical load may be deemed as one not to be subjected to a reduction factor below a threshold value $s_i$. In this case a reduction factor $r_i$ is applied to it such that $r_i = s_i$ if $r < s_i$ and $r_i = r$ otherwise.

Thus the new wave streams to be distributed have varying temporal lengths $r_i \cdot Ton_i$.

To take into account the reduction factor r and the threshold values $s_i$, the new wave streams are distributed in the modulation period by application of the method described above.

Figure 9A:
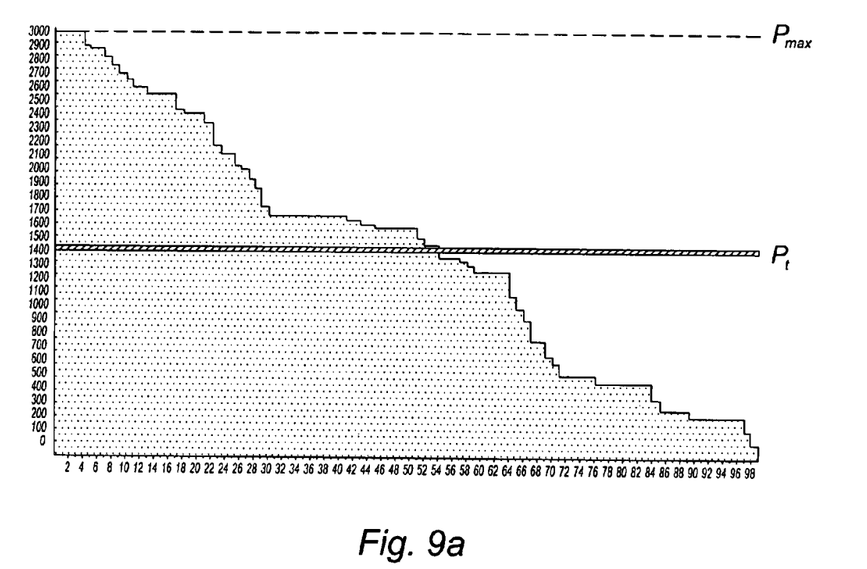
FIG. 9a shows a non-optimum distribution of a plurality of electrical signals in the same modulation period.

FIG. 9a shows the evolution of the power emitted by the generator 14 during a modulation period to supply power to a large number n of electrical loads when no distribution method is applied. Note that all the wave streams begin at the time $t_0$ of the modulation period, which inevitably produces a very low efficiency factor.

Figure 9B:
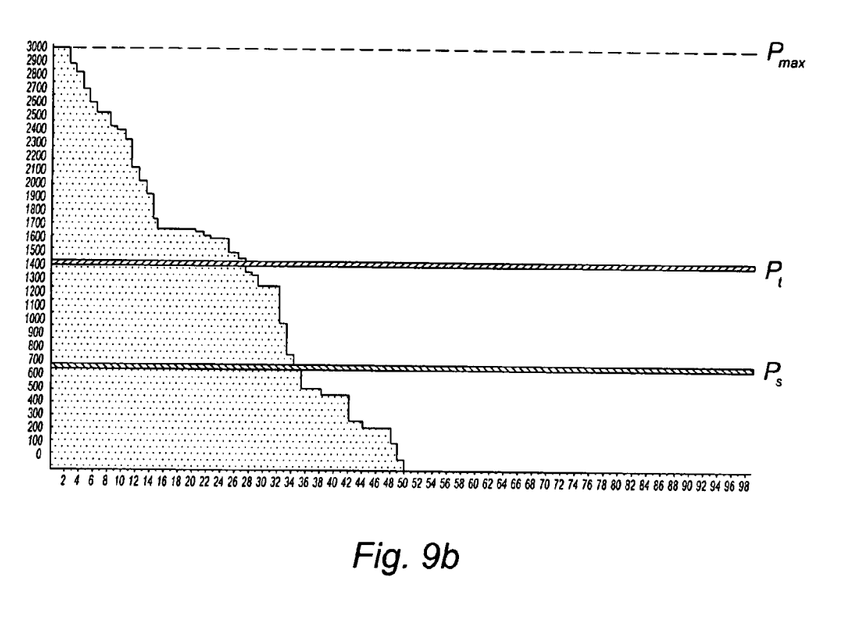
FIG. 9b shows a non-optimum distribution of a plurality of electrical signals in the same modulation period, after application of a reduction factor in accordance with the invention.

Applying a reduction factor r as defined above, equal to 0.5, for example, to all the electrical loads, and again without applying any distribution method, there is obtained, as indicated in FIG. 9b, the same distribution profile as in FIG. 9b, but compressed temporally by a factor of 0.5. The resulting efficiency factor is at least as low as the previous one.

Figure 10A:
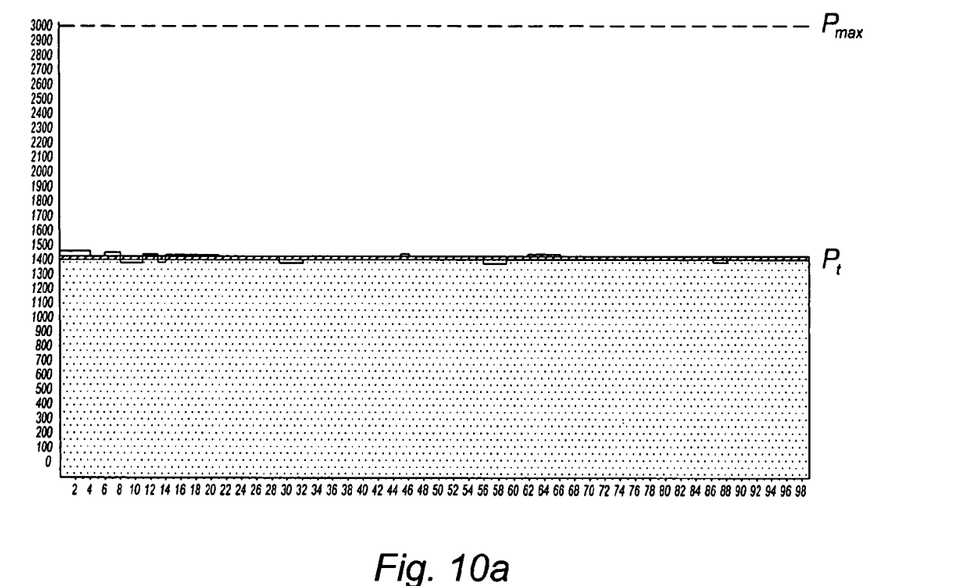
FIG. 10a shows an optimum distribution of a plurality of electrical signals in the same modulation period after application of the method from FIG. 4.

Comparatively, for the same number of electrical loads and the same wave streams to be delivered by the generator 14, the distribution represented in FIG. 10a is obtained after application of a method according to the invention. The distribution obtained supplies to the n electrical loads the same screens of waves as in FIG. 9a. On the other hand, the efficiency factor obtained is significantly higher, and even very close to 1, which means that the instantaneous power distributed by the generator 14 is quasi-constant and remains very close to the average power $P_t$ necessary for supplying the n electrical loads.

Figure 10B:
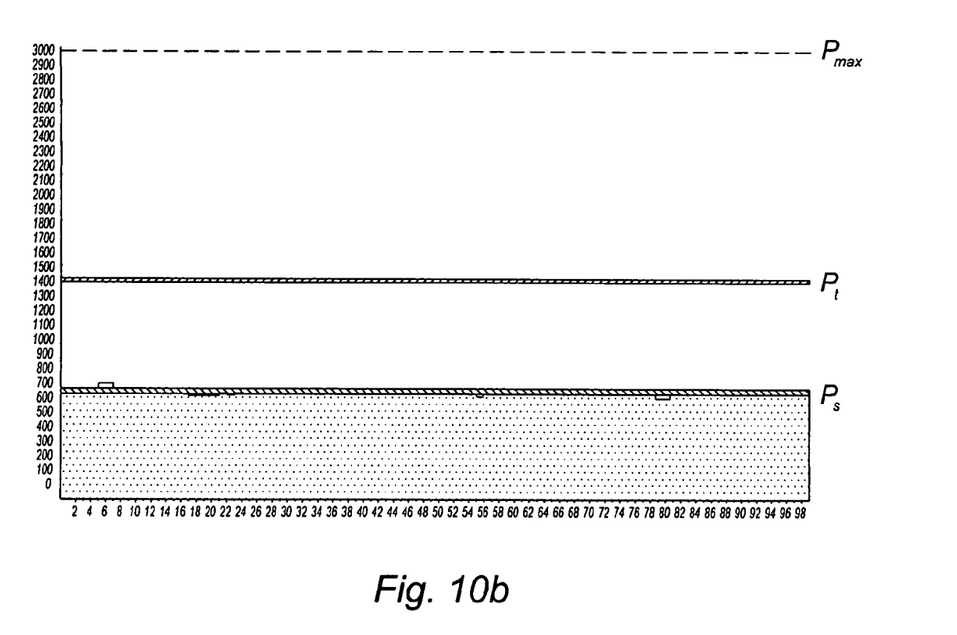
FIG. 10b shows an optimum distribution of a plurality of electrical signals in the same modulation period, after application of the method from FIG. 4 and the reduction factor.

FIG. 10b shows that, by imposing a reduction factor r identical to that of FIG. 9b, and again executing a method according to the invention, a new distribution is obtained the efficiency factor whereof remains very high and very close to 1. The instantaneous power distributed by the generator 14 is quasi-constant and remains very close to the average power necessary for supplying the n electrical loads corrected by the reduction factor r ($P_s$).

Thanks to the application of the method described above, a very good distribution is obtained, in the same modulation period, of the various electrical signals to be emitted by a generator 14 to a plurality of electrical loads $12_1, 12_2, \ldots, 12_n$. This optimized distribution remains at all times very close to the value of the average power necessary for supplying the electrical loads. It thus becomes much simpler for a user having a certain number of electrical loads to be supplied and knowing the overall requirement of those electrical loads to choose a fixed-price agreement with an electrical energy supplier, without fear of locally exceeding that fixed charge.

It will further be noted that the invention is not limited to the embodiment described above. In particular, the electrical signals output by the generator are not necessarily wave streams, for example if the application envisaged concerns the distribution of direct current electrical energy.

The invention claimed is:

1. A method of determination of a distribution of energy to a plurality of electrical loads ($12_1, 12_2, \ldots, 12_n$) during a modulation period (T),
   the modulation period being a time period during which power of an electrical load current is varied,
   the energy coming from at least one generator (14),
   the supply of a predetermined quantity of energy to any one of the electrical loads during this modulation period being effected by the generator, emitting during a predetermined fraction of the modulation period, an electrical signal the power whereof corresponds to that demanded by said electrical load,
   this method including a temporal distribution (102, 104, 106, 108, 110, 112) of the electrical signals emitted by the generator in the modulation period in accordance with a distribution criterion determined as a function of the electrical signals and applied successively to each electrical signal in the same modulation period,
   wherein the temporal distribution criterion for the electrical signals is determined as a function of the temporal length and the power of the electrical signals.

2. The method according to claim 1 of determination of an energy distribution, including a step (100) of classification of the electrical signals in priority order in accordance with a predetermined priority criterion, this classification step being effected before the distribution (102, 104, 106, 108, 110, 112) of the electrical signals in the modulation period.

3. The method according to claim 2 of determination of an energy distribution, wherein the priority criterion is determined from one of the elements of the group consisting of the temporal length ($Ton_i$) of each electrical signal, the power ($P_i$)

of each electrical signal and the product of the temporal length by the power of each electrical signal.

4. The method according to claim 2 of determination of an energy distribution, including a plurality of classification steps (100) in accordance with a plurality of respective priority criteria, each classification step being followed by a step of distribution (102, 104, 106, 108, 110, 112) of the electrical signal's in the modulation period and a step of assessing if that distribution is the optimum distribution by the calculation of an efficiency factor, the distribution finally retained (114) being that corresponding to the best value of the efficiency factor.

5. The method according to claim 2 of determination of an energy distribution, wherein the successive temporal distribution of the electrical signals in the modulation period (T) is iterative and includes the following steps in each iteration in which a temporary distribution in the modulation period induces at least one power range:

selection (102), in this temporary distribution, of a minimum power range;

if the electrical signals to be distributed include at least one electrical signal whose temporal length is identical to that of the selected range, selection (104) of the electrical signal of higher power whose temporal length is equal to that of the selected range;

if not, selection (106) of the next electrical signal in the priority order defined during the classification step (100);

positioning (108) of said electrical signal in the selected range, thus generating a new temporary distribution.

6. The method according to claim 1 of determination of an energy distribution, wherein, the distribution of the predetermined quantity of energy to each electrical load ($12_i$) necessitating the global emission by the generator (14) of an average electrical power during the modulation period (T), there is further defined a reduction factor for that average electrical power, said reduction factor then being applied to each predetermined quantity of energy to be supplied to the corresponding electrical load ($12_i$).

7. The method according to claim 6 of determination of an energy distribution, wherein there is further associated with at least one electrical load ($12_i$) a minimum threshold value of the reduction factor applied to said electrical load ($12_i$).

8. A system (10) for distribution of energy to a plurality of electrical loads ($12_1$, $12_2$, ..., $12_n$) during a modulation period, the modulation period being a time period during which power of an electrical load current is varied, the energy coming from at least one generator (14), comprising at least one switch ($16_1$, $16_2$, ..., $16_n$) per electrical load for the supply of a predetermined quantity of energy to said electrical load during said modulation period by the transmission of an electrical signal, the power whereof corresponds to that of said electrical load and that is emitted by the generator (14), during a predetermined fraction of the modulation period, wherein said system further includes a calculator (18) for effecting a temporal distribution of the electrical signals emitted by the generator in the modulation period in accordance with a distribution criterion determined as a function of the temporal length and the power of the electrical signals and applied successively to each electrical signal in the same modulation period, and a device (20) for controlling the switches for application by the switches of this temporal distribution effected by the calculator.

9. The energy distribution system according to claim 8, wherein each switch ($16_1$, $16_2$, ..., $16_n$) includes at least one thyristor.

* * * * *